(12) United States Patent
Schmierer

(10) Patent No.: US 8,002,307 B2
(45) Date of Patent: Aug. 23, 2011

(54) AIR BAG IN REAR VIEW MIRROR

(75) Inventor: Arne Schmierer, Kirchheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 12/763,275

(22) Filed: Apr. 20, 2010

(65) Prior Publication Data

US 2010/0264633 A1   Oct. 21, 2010

(30) Foreign Application Priority Data

Apr. 20, 2009   (DE) .......................... 10 2009 019 090

(51) Int. Cl.
*B60R 21/16*   (2006.01)
(52) U.S. Cl. ............... 280/728.2; 280/728.3; 280/743.1; 180/274
(58) Field of Classification Search ............... 280/728.2, 280/728.3, 730.2, 731; 180/274
See application file for complete search history.

(56) References Cited

U.S. PATENT DOCUMENTS

| | | | |
|---|---|---|---|
| 6,920,954 B2 * | 7/2005 | Hashimoto et al. | 180/274 |
| 2004/0182629 A1 * | 9/2004 | Takahashi et al. | 180/274 |
| 2005/0007256 A1 * | 1/2005 | DeLine et al. | 340/815.4 |
| 2010/0148476 A1 * | 6/2010 | Inoue et al. | 280/728.2 |
| 2010/0164203 A1 * | 7/2010 | Inoue et al. | 280/728.2 |

FOREIGN PATENT DOCUMENTS

| | | |
|---|---|---|
| DE | 102008011468 | 9/2008 |
| JP | 2009023600 | 2/2009 |
| WO | 9961288 | 12/1999 |
| WO | 2009011731 | 1/2009 |

OTHER PUBLICATIONS

German Search Report for German Patent Application No. 10 2009 019 090.2-51 dated Nov. 20, 2009.
European Search Report for Application No. EP10157487.9-1523 dated Sep. 10, 2010.

* cited by examiner

*Primary Examiner* — Toan C To
(74) *Attorney, Agent, or Firm* — Reising Ethington P.C.

(57) ABSTRACT

A rear-view unit with an airbag device is presented, wherein the rear-view unit is set up in such a way that it has expected break points and/or flexible connections in different positions. The rear-view unit is completely clad by an air pocket of the airbag device.

12 Claims, 6 Drawing Sheets

AIR BAG IN REAR VIEW MIRROR

The invention is based on a priority patent application DE 102009019090.2 which is hereby incorporated by reference.

BACKGROUND OF THE INVENTION

1. Field of the Invention

The invention concerns a rear-view unit that has a fastener for fastening on a vehicle and at least one opening for receiving a reflecting element or a camera, wherein the rear-view unit contains an airbag device.

2. Description of the Related Art

Exterior mirrors in vehicles underlie the regulations according to ECE R46. These safety regulations require that vehicle exterior mirrors can be removed towards and away from the direction of travel, if they are struck with a defined force.

Exterior mirrors that have a gap of only 15 cm of gap from the body of the vehicle do not have to be molded so that they can be removed. In the instance when a camera replaces an exterior mirror, such fixed installations are advised.

Avoidance of the exterior mirror protects the weaker participants in traffic, and in most cases is sufficient to reduce injuries. What the exterior mirror is not designed for is a side impact or an impact at a very acute angle perpendicular to the longitudinal axis of the exterior mirror.

In the solutions established for the camera rear-view system, a protection of the pedestrian is only possible via impact protection.

And active pedestrian protection is more and more important, vehicles have to follow the requirements. The rules of the Euro-NCAP program assign ratings to vehicles with particularly distinctive protection for pedestrians. All the same, until now not very much has been implemented in serial production.

The present invention is concerned with active protection of road users by the use of an airbag device for protecting pedestrians, which is located on the inside of an exterior mirror of a vehicle and contains an airbag that can be inflated with a filling gas in order to cover the perimeter of the exterior mirror.

Airbag devices for protecting pedestrians are known, e.g. from DE 102008011468. The airbag device contains airbags folded together, which are accommodated on the right and left side of a cover for covering the front faces of front pillars of a vehicle upon deployment.

In vehicles, available airbag modules are mostly arranged behind inner covering parts, such as e.g. a dashboard or pillar covering. In order to ensure emergence of the airbag in case of use, outlet openings are integrated in the inner cover parts. These are mostly specified in the form of cover caps that can be available in various lot sizes depending on the airbag.

A flat material of the inner covering part that is conventionally used is constructed out of the following layers: on the outside, direction vehicle interior, as a covering layer a slush making up the visible surface, lying underneath that a foam and a supporting layer as a supporting structure, giving form to and stabilising the flat material. The cover caps required for the outlet opening to be formed in case of use of the airbag are specified by a weakness in the support structure and foam incorporated into the rear side of the inner cover parts.

By activation of the airbag, the cover caps are opened at pre-defined cap axes and release an outlet opening for the airbag, so that an unhindered unfolding of the airbag is guaranteed. The cap axes necessary for a controlled opening of the cover caps are provided by the weaknesses incorporated into the support structure and the foam. In a system with several cover caps, an expected break line is incorporated into the flat material in a system with several cover caps, in order to be able also to guarantee a controlled, defined and reproducible opening of the cover cap. The supporting structure and the foam is likewise weakened along the expected break line.

The forces arising upon activation of the airbag, which simultaneously trigger the opening of the cover cap, can lead to dislodging of individual pieces of the support structure and/or the foam. These can be thrown in the direction of the vehicle interior with the inflating airbag, respectively in the direction of the vehicle passengers. This event represents a potential danger for the vehicle passengers.

In order to avoid this, fabric layers are incorporated into the slush in the areas of the cover caps, as is known (WO 99/61288).

An airbag device in an exterior mirror is known from JP 2009023600. The airbag emerges on an expected break edge in the covering of the mirror head. The airbag thereby unfolds along the A column and the front screen, bonnet of the vehicle.

The rear-view unit according to the invention has an area that possesses expected break lines such as are known from the vehicle interior, along which the rear-view unit cuts and the airbag emerges. The expected break line thereby extends in the space of the exterior mirror or the camera housing, or along an indicator module.

In contrast to the prior art, the danger of pieces forced off is less when the airbag is in the exterior mirror. Nevertheless, the invention tries to avoid having pieces of the exterior mirror flying around.

The airbag for the exterior mirror or camera is advantageously constructed in such a way that it completely clads the mirror, and not only towards one side, when an airbag emerges.

The advantage of the protection of pedestrians and weaker road users is clearly recognized.

BRIEF DESCRIPTION OF THE DRAWINGS

The invention is shown in the drawings and explained in more detail in the following description.

DETAILED DESCRIPTION OF THE DRAWINGS

An exterior mirror was chosen as an exemplary specification for the rear-view unit. The embodiments according to the invention can also extend to a rear-view unit with a camera module. The camera is thereby incorporated into a camera housing and mounted on the vehicle with a housing base. As a camera solution can be set up very small in comparison to the mounting of an exterior mirror, the airbag can also only be dimensioned small, as otherwise not enough cladding material can be folded in the housing. Nevertheless, neither is a large airbag necessary for passive protection.

Figure 1:
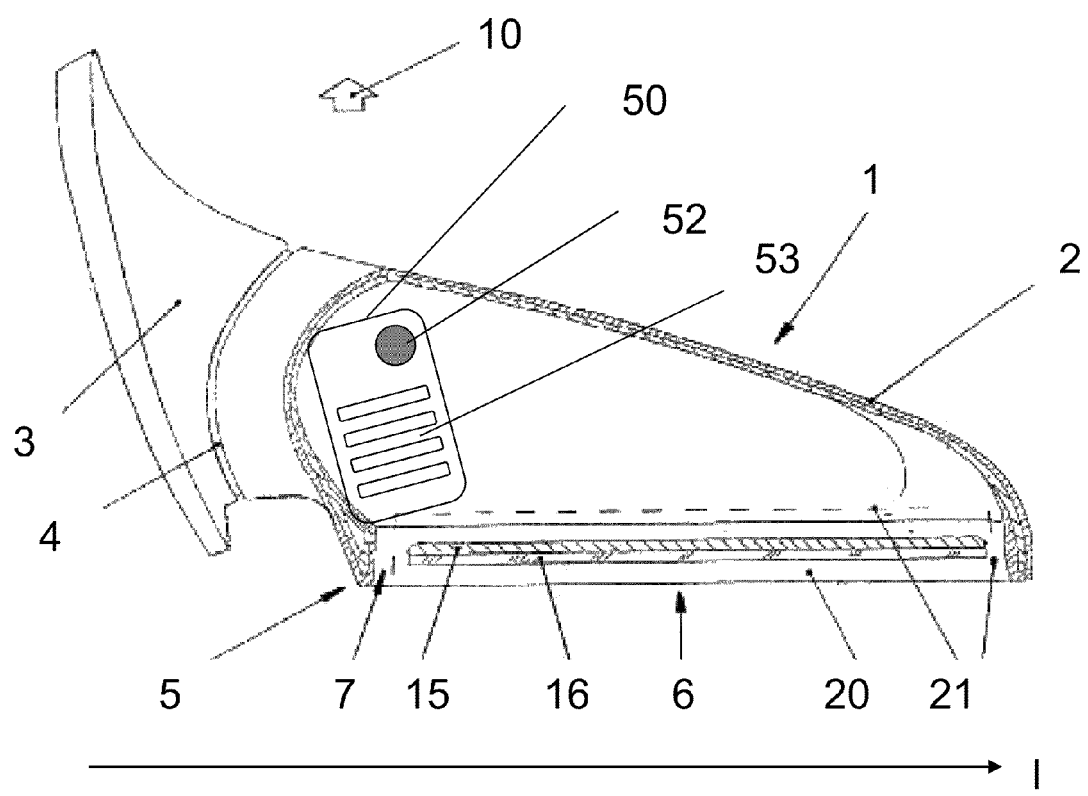
FIG. 1 shows an exemplary exterior mirror in longitudinal section.

FIG. 1 is a longitudinal section of an exterior mirror 1 of a motor vehicle with movable parts of the edge area 5 of the mirror housing 2. The exterior mirror 1 has a mirror base 3 to be fastened on the body of the vehicle, on which is located the mirror housing 2 that can be pivoted into and against the direction of travel 10. A slit 4 is provided between the mirror foot 3 and the mirror housing 2, the slit 4 provides the necessary free space for a flawless and unhindered pivoting of the mirror housing 2. The longitudinal axis I of the exterior mirror is shown in the Figure.

The mirror housing 2 has an opening that is essentially closed by a mirror glass 16. A narrow, circumferential gap 7 is provided between the mirror glass 16 and the inside of the edge area 5 of the mirror housing 2, a gap which makes it possible for the mirror glass 16 to be pivoted unhindered in the vertical and horizontal directions.

A housing 50 with a folded airbag 51 and a gas inflation device 52 is incorporated in the interior of the mirror housing 2. The size, shape and direction of mounting of the airbag device is adapted to the particular mirror design, and is only shown as an example in the Figure.

Movable, or rather unhingeable, subareas 20 are provided in the parts of the edge area 5 at the top, the bottom, and far from the body. They are bordered towards the mirror housing 2 by a dividing line 21. In case of triggering of the airbag, this part of the edge area 5 is fully released from the mirror housing 2. The edge area 5 can be formed as one piece from the mirror housing 2. It is also possible to form the edge area 5 by a separate, added mirror frame. In such an embodiment, the mirror glass would remain installed in the opening of the mirror housing and would not be forced off, in order to avoid injuries. The airbag unfolds from the edge area of the mirror head and clads mirror glass and mirror head both in and away from the direction of travel. For this, the airbag has to be positioned in such a way that the unfolding air pocket can unfurl past on a mirror carrier located in the mirror with a glass moving motor and the mirror glass.

Figure 2:
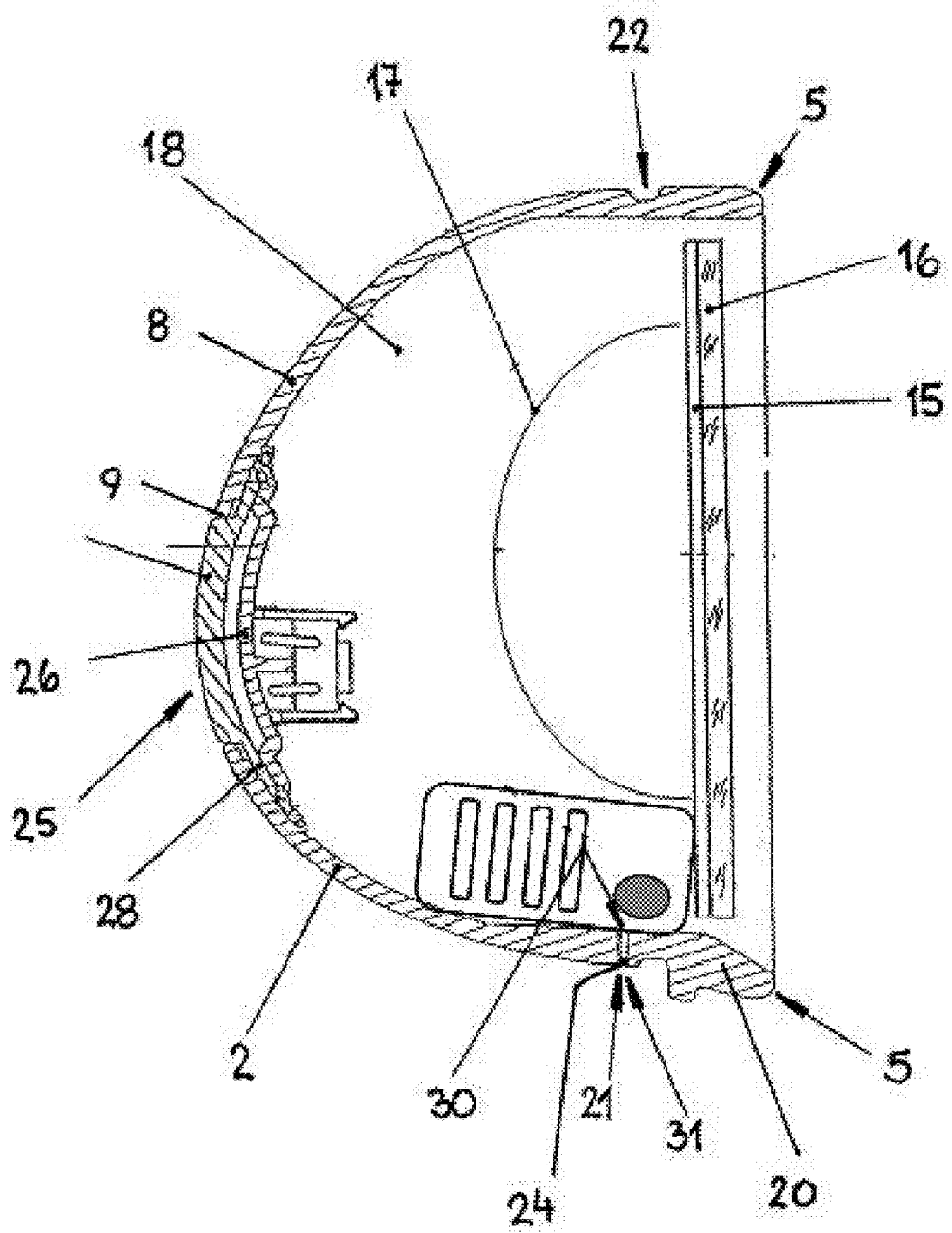
FIG. 2 shows an exterior mirror with indicator in cross section.

The movable part of the edge area 5 is indicated in FIG. 2 by a dotted dividing line 21. A part 20 of the edge area can be removed from the mirror housing 2 along this dividing line 21. In another embodiment, the mirror glass 16 is forced out of the housing. There is thereby only a small danger of injury with the use of plastic glass.

As FIG. 2 shows, the mirror glass 16 is seated on a mirror glass carrier 15, which can be adjusted by means of an adjustment 17 drive in the known way. The mirror housing 2 has a rear wall 8 pointing forwards in the direction of travel 10, a wall which is curved concave in cross section. The mirror housing 2 can be closed or have an opening 9, into which a repeating indicator lamp 25 can be inserted. It has a glass panel 26, which is fastened on the inside of the rear wall 8 with an edge 28 that is reduced in thickness. The glass panel 26 is located with its outside advantageously flush with the outside of the rear wall 8. The glass panel 26 is part of a lamp housing 27, which is located inside the interior 18 of the mirror housing 2.

The mirror housing 2 is provided on its upper side near to the edge area 5 with a water runoff channel 22. In FIG. 2, opposite, a subarea 20 of the edge area 5 is shown, which is connected with the residual part of the mirror housing 2 via an expected break point 31. The expected break point 31 runs along the dividing line 21 and is provided on the inside of the mirror housing 2, so that it is not visible from the outside. The expected break point 31 is thereby formed in that the subarea 20 is connected to the mirror housing 2 via a thin bar 24. A gap 30 is provided between the subarea 20 and the mirror housing 2 in the area of the bar 24.

The airbag device is installed on the mirror carrier plate 15 in this exemplary embodiment. The aim is to separate the whole mirror housing from the rest of the exterior mirror in a situation of danger. The charge of the airbag forces the mirror housing 2 off at the expected break point 31, wherein the water runoff channel 22 serves as a hinge line. In this way, the mirror housing 2 remains connected to the mirror and does not fly around uncontrolled. Specifications using flexible material such as in the prior art also come to be used here.

In a further embodiment, the mirror housing is also separated completely from the rest of the exterior mirror on the water runoff channel 22. Complete forcing of the mirror housing is not a danger in this embodiment, since the cabling connecting the indicator onto the electric system of the vehicle bolsters the components forced off.

Figure 3:
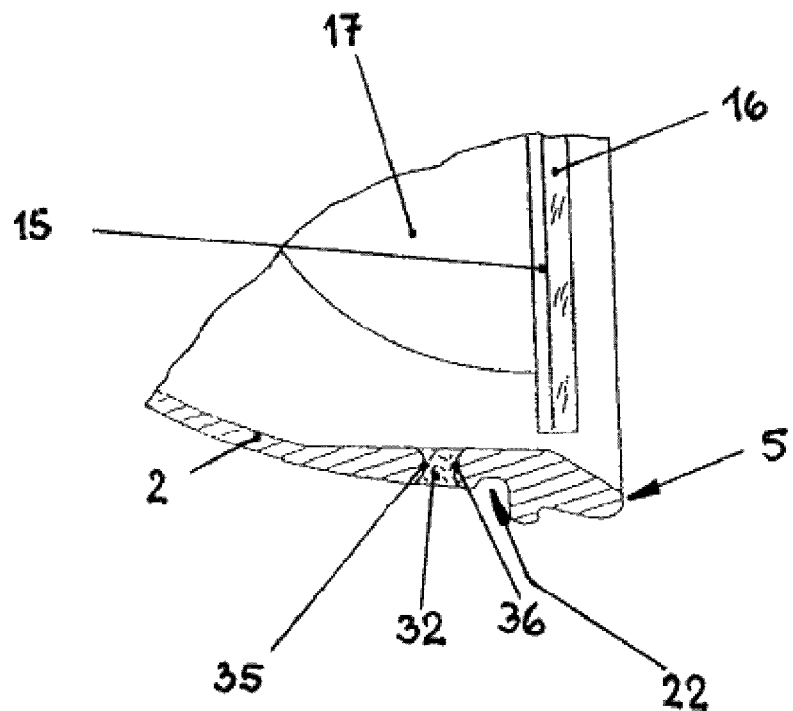
FIG. 3 shows an edge piece in cross section.

In the embodiment according to FIG. 3, the edge area 5 is bonded onto the mirror housing 2 by means of an elastomer intermediate layer 32. This edge area 5 can be constructed as a circumferential frame corresponding to the previous embodiment, a frame which is bonded onto the mirror housing 2 via an elastomer intermediate layer 32. As in the previous embodiment, only one or several subareas of the edge area 5 can also bonded with the mirror housing 2 via this elastomer intermediate layer 32. The edges 35, 36 of the mirror housing 2 facing each other, and the edge area 5, are each curved convex in cross section. Through this, a reliable connection of the edge area 5 with the mirror housing 2 is achieved via the intermediate layer 32. The intermediate layer 32 has a thickness such that it forms a continuous transition in the transition zone between the mirror housing 2 and the edge area 5. Through this, both the inside and the outside of the mirror housing in the area of the intermediate layer 32 are not provided with an offset, but rather the inside and the outside of the intermediate layer 32 form a constant continuation of the inside and outside respectively of the mirror housing 2 and the edge area 5.

Figure 4:
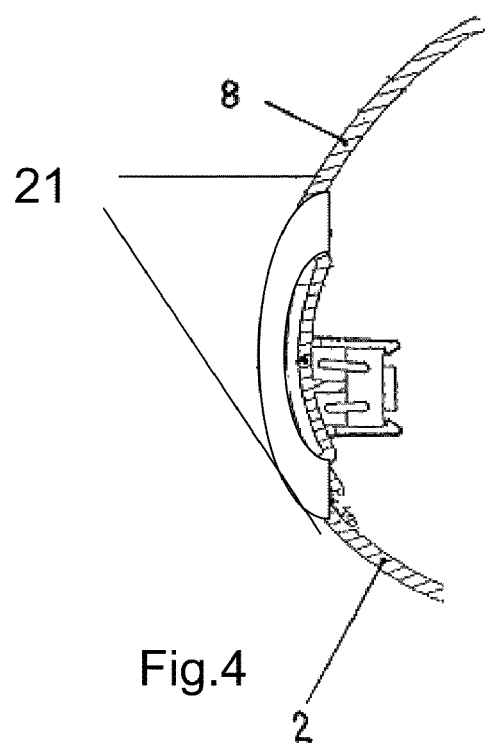
FIG. 4 shows an indicator module.

FIG. 4 shows an embodiment with an indicator such as in FIG. 2. The indicator module extends from the side furthest from the vehicle along the exterior contour of the mirror housing cover. The indicator module is thereby constructed in such a way that the module is connected with the mirror housing 2 via plug connections or clips. If the airbag is triggered, then the indicator module is forced out from the mirror housing and the airbag can unfurl through the opening formed. The indicator module forced out is intercepted via the electrical connections and prevented from freely flying around. The mounting line of the indicator module and the mirror housing therefore form the expected break lines that are broken upon triggering of the airbag. Through the breaking open of the mirror housing along the indicator module, there arises a sufficiently large opening to allow the air pocket to emerge. The outlet opening extends along the mirror housing with an opening width corresponding to the overall height of the indicator module. The forcing motion begins at the end of the exterior mirror furthest from the vehicle, so that the indicator is broken out in the vehicle direction. Through this, the cabling that is normally located at the end of the indicator module nearest the vehicle also remains held, and can intercept the indicator module.

Figure 5:
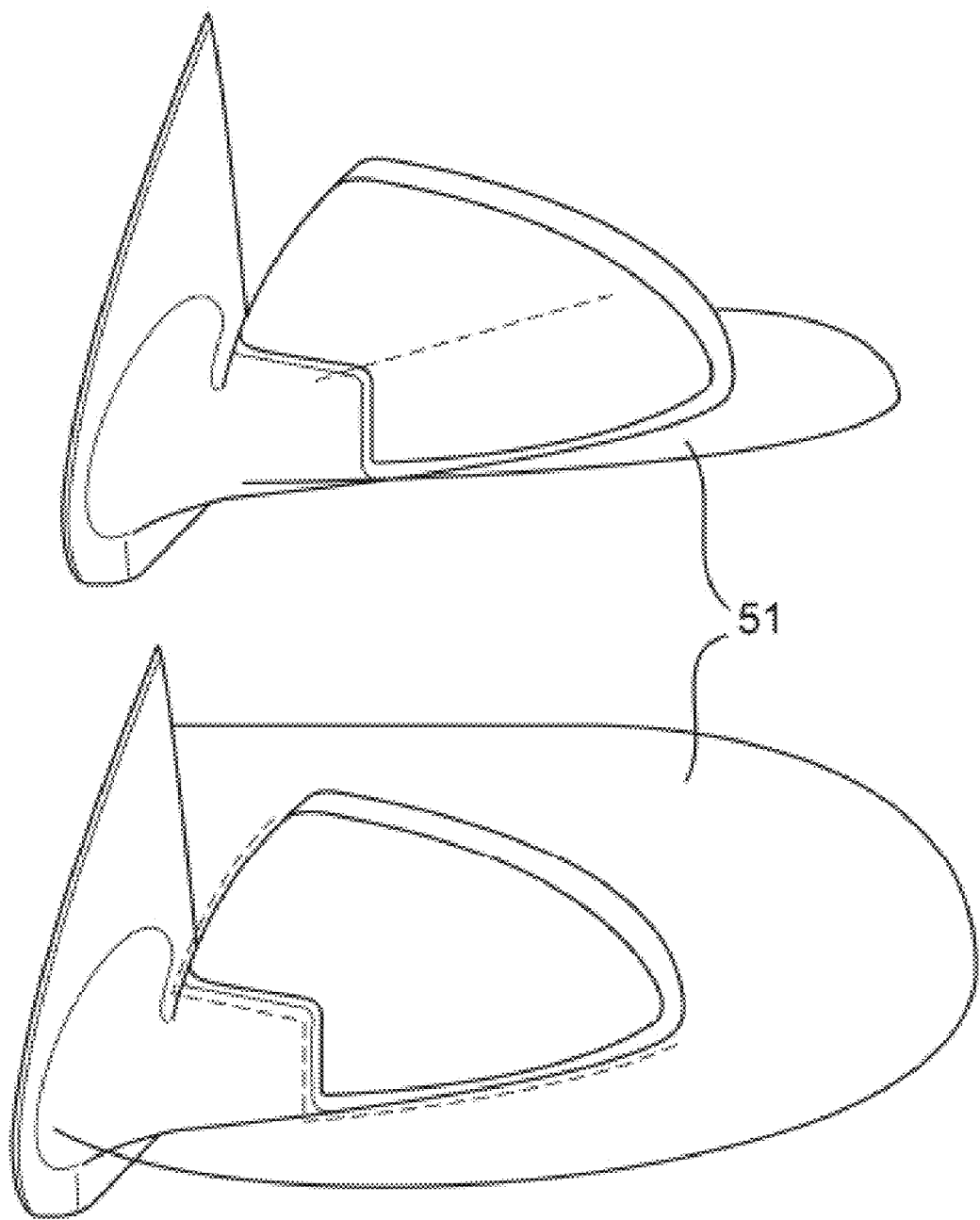
FIG. 5 shows two examples with expected break points.
Figure 6:
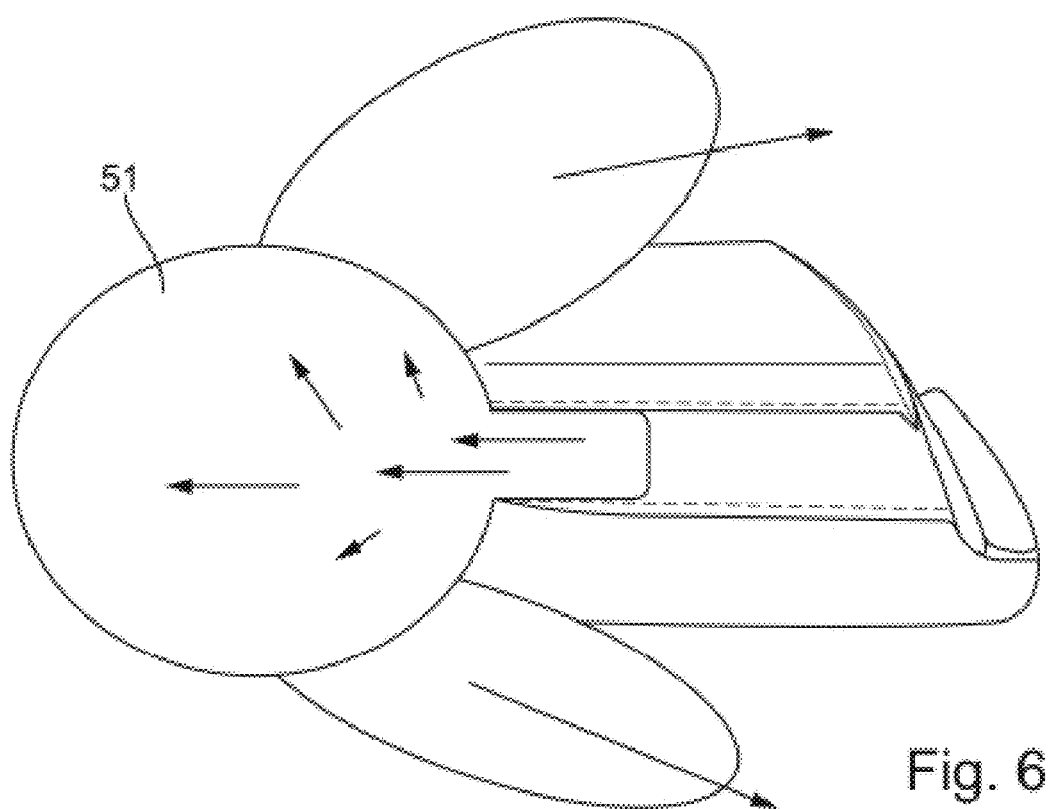
FIG. 6 shows a further example with expected break points.

FIG. 5 shows an example of a mirror housing seen against the direction of travel. The white line marks an expected break point that runs invisibly from the outside in the housing. The housing itself is placed on a mirror frame and a mirror base cover. The connection can also be formed flexible, or so that it can be broken off. A particularly advantageous embodiment is thereby the one that uses a so-called scalp as mirror housing. This decorative covering represents an exchangeable plug-on part, which plugs into the mirror housing. The scalp can be formed with or without a means of illumination.

The solution according to the invention for a pedestrian airbag in the exterior mirror has to guarantee a extensive unfolding of the airbag, in fact, the exterior mirror has to be encased with an air pocket formed in whatever way. Both sides of the rear-view device, front and back, are equipped with a collision protection.

The airbag device for protecting pedestrians according to the invention is adapted in such a way that it is fastened inside of the exterior mirror under a covering. The airbag device contains an airbag unit, which can be filled with filling gas, in order to cover the rear side of the mirror and its front side, an inflation device for conducting the filling gas into the airbag and a container in which the inflation device and the airbag are accommodated folded up. The inflation device is constructed in such a way that the direction of emergence of the filling gas that is injected into the airbag in the interior of the housing generally extends outwards parallel to the orientation of the mirror. The housing 50 of the airbag contains a rear wall that serves as an opening wall, which makes possible emergence of the airbag. Upon operation of the aforementioned airbag, the airbag fills with filling gas that is conducted by the inflation device, emerges from the housing and then unfolds in order to cover the mirror.

The inflation device is constructed in such a way that its direction of emergence of the filling gas to the airbag in the interior of the housing generally runs parallel to the longitudinal axis I of the mirror.

As a consequence, in the original condition of the airbag unfolding, the housing allows the airbag to unfold along the contour of the exterior mirror.

Hence the airbag device for protecting pedestrians in the exterior mirror is in a position to quickly unfold the airbag in a stable way and with a simple structure, in order to cover the whole exterior mirror.

Moreover, it is possible that the airbag contains a bellows-folded area, which is folded in the direction from front to back in the manner of a bellows, and that the bellows-folded area has a length such that it makes it possible for the area folded inwards to lie over the exterior mirror upon unfolding.

There are methods described in the prior art for triggering the airbag. Airbags are triggered with the help of sensor data, wherein prevalent sensors measure decelerations of the vehicle. Such a method is rather unsuitable for triggering an exterior airbag.

What lends itself to an airbag in the exterior mirror is to make triggering dependent on measuring an approach. Ultrasound, radar or optical signals are analysed for this.

Triggering does not happen due to deceleration of the vehicle, but rather due to approach of the vehicle side. So that the airbag is not triggered by every bicycle going past, the triggering mechanism has to be set up to be intelligent.

Here, a camera system that can be fastened both in the exterior mirror itself and on the vehicle recommends itself. The camera detects an approaching object and the processing software evaluates the images. The object is thereby classified according to its dangerousness and the speed of approach is determined.

An advantageous embodiment of the triggering system triggers the airbag only after object recognition of a pedestrian, motorcycle or bicycle rider. A side impact from a larger object does not trigger the exterior mirror airbag.

An advantageous embodiment of the triggering software evaluates additional parameters of the vehicle, such as are available on the vehicle bus system. That will be a CAN bus, a LIN bus or a similar bus. These data serve to refine the triggering software.

Figure 7:
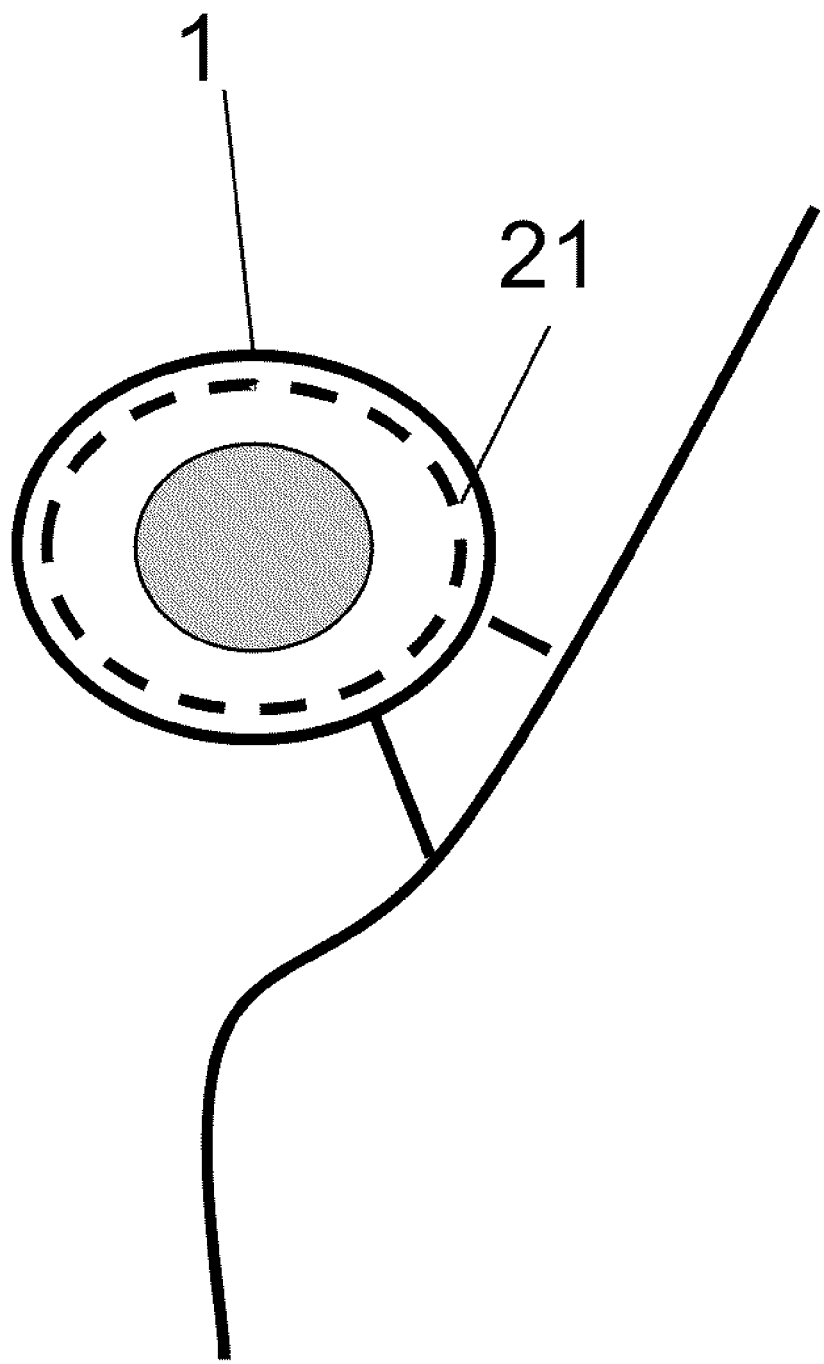
FIG. 7 shows a camera unit

All named variants of the embodiment can be extended to a rear-view unit with a camera. Such a rear-view unit extends beyond over the external contour, such as is shown in FIG. 7, and becomes a danger for pedestrians. Here too, protection through triggering of an airbag is welcome. The expected break point 21 along the contour of the housing allows for emergence of the airbag around the camera sensor that is shown in the middle. The form of the airbag is thereby such that the rear-view unit is clad in the direction of travel 10 and against the direction of travel 10.

It is thereby advantageous that in a rear-view camera the sensors do not have to be built in or connected separate. Upon a suitable angle of view of the camera or of a subpart of the camera, triggering of the airbag is possible directly after gathering of the image data.

The invention claimed is:

1. A rear view assembly for a motor vehicle, said rear view assembly comprising:
a bracket or fastener for fastening said rear view assembly to a side of the motor vehicle;
a mirror housing defining at least one opening for receiving a reflecting element or a camera facing rearward, said mirror housing extending from said bracket outwardly along a generally longitudinal direction to an outboard distal end and including a break point running in said longitudinal direction; and
an airbag device including an airbag housing, an airbag and a gas inflation device fixedly secured in said mirror housing in such a way that when said gas inflation device discharges, said airbag emerges through said break point and clads said rear view assembly in and against the direction of travel wherein said airbag extends out beyond said outboard distal end to protect those outside the motor vehicle during a collision with said rear view assembly.

2. A rear view assembly according to claim 1 including a frame secured to said mirror housing about said at least one opening wherein said break point runs between said frame and said at least one opening.

3. A rear view assembly according to claim 1 wherein said airbag emerges through said break point in such a way that the reflecting element or the camera is forced out of said mirror housing.

4. A rear view assembly according to claim 1 wherein said mirror housing includes an indicator module extending along the longitudinal axis of said mirror housing such that said break point runs along a contour defined by said indicator module.

5. A rear view assembly according to claim 4 wherein said indicator module is plugged into said mirror housing of said rear view assembly and the airbag unfolds out of an indicator opening of said mirror housing that engages the indicator module before forcing off by said airbag when said gas inflation device discharges.

6. A rear view assembly as set forth in claim 5 wherein said indicator module is blasted from out of said outboard distal end furthest from the motor vehicle.

7. A rear view assembly according to claim 1 wherein said expected break point consists of a diminishing of the material strength.

8. A rear view assembly according to claim 1 wherein said break point consists of an elastic material.

9. A rear view assembly according to claim 1 wherein said airbag device is triggered by a control signal that is sent via a signalling cable to said rear view assembly.

10. A rear view assembly according to claim 1 wherein said airbag device is triggered by a control signal that is generated by sensors in said rear view assembly.

11. A rear view assembly according to claim 7 wherein said airbag device is triggered by a control signal that is generated after image analysis of at least one camera image.

12. A rear view assembly according to claim 7 wherein said airbag device is triggered by a control signal that is generated after evaluation of the approach of objects.

* * * * *